Jan. 8, 1946.    H. J. JOHNSON    2,392,743
HIGH SPEED BELT
Filed Feb. 18, 1943

INVENTOR.
HAROLD J. JOHNSON
BY Martin E. Anderson
ATTORNEY

Patented Jan. 8, 1946

2,392,743

UNITED STATES PATENT OFFICE 2,392,743

HIGH-SPEED BELT

Harold J. Johnson, Denver, Colo., assignor to The Gates Rubber Company, Denver, Colo., a corporation of Colorado Application February 18, 1943, Serial No. 476,364

3 Claims. (Cl. 74—232)

This invention relates to improvements in high speed belts.

In many machines and more particularly in machines employed in spinning cotton, certain spindles must be rotated at a very high speed and this rotation must be effected by means of belt transmission.

Such spindles, although they rotate at a very high speed require only a comparatively small amount of power and therefore the belt tension is comparatively small.

As a rule belts employed for such high speed transmission, are comparatively short and since the speed is very high, the belts are subjected to flexure many times a second and it is therefore essential that such belts be very thin and flexible so as to prevent the building up of excessive temperatures.

Due to the very high speed at which such belts rotate, the centrifugal force developed during the passage of the belt around the pulleys becomes very great, in fact it frequently happens that the centrifugal force developed becomes sufficient to peel off any outside rubber covering.

It is an object of this invention to produce a belt of such construction that it can operate at a very high speed without the development of excessive temperatures.

Another object of the invention is to produce a belt of great flexibility that shall be capable of transmitting the required amount of power and at the same time resist the centrifugal forces developed in turning about the pulleys.

This invention, briefly described, consists in a belt having one layer of spirally wound tension elements connected by an inner transverse layer of similar cords, the tension and binding cords being connected by a suitable vulcanized rubber-like composition.

Another object of this invention is to produce a belt of the construction indicated in which the ends of the spirally wound tension elements shall be tied into the body of the belt so that they will not be torn loose by the action of the centrifugal forces.

Another object is to produce a belt having the tension cords wound in two groups spaced along the middle of the belt to obtain an increased centering action on a convex pulley.

Having thus briefly described the objects of the invention and the construction by means of which these objects are attained, the belt will now be described in detail and for this purpose reference will be had to the accompanying drawing in which the construction of the belt has been illustrated, and in which.

Figure 1:
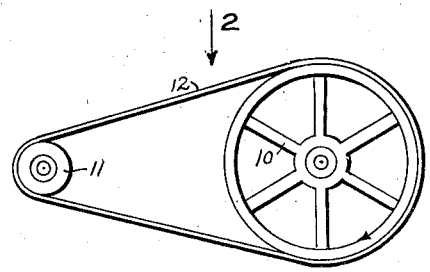
Figure 1 is a side elevation looking in the direction of arrows 1—1 Figure 2, showing a belt drive in which power is transmitted by means of a belt from a large driving pulley to a small driven pulley.
Figure 2:
Figure 2 is a top plan view looking in the direction of arrow 2, Figure 1.

In the drawing, reference numeral 10 designates a driving pulley and reference numeral 11, a driven pulley. In the embodiment illustrated, pulley 10 rotates in a clockwise direction. The belt has been indicated by reference numeral 12.

The belt consists of a layer 13, of spirally wound tension elements, such as cotton, rayon or wool cords or cord-like elements, such as wires of small diameter and suitable composition, either as single strands or braided or twisted. The term "cord" as herein employed is used in a sense broad enough to embrace all of the above equivalents.

In the drawing, two spaced groups of cords have been shown, each group comprising three turns.

Figure 5:
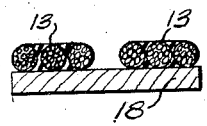
Figure 5 is a section taken on line 5—5, Figure 3.
Figure 3:
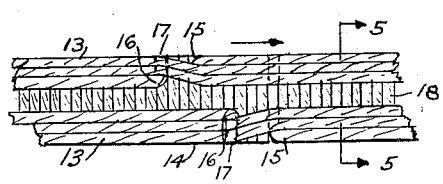
Figure 3 is a top plan view of a short section of the belt showing the cords to an enlarged size.
Figure 4:
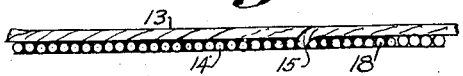
Figure 4 is an edge view of the belt looking upwardly in Figure 3.

Referring now to Figures 3, 4 and 5, the winding commences at point 14, the cord extends across the belt to point 15, from which the cords are wound from left to right in the direction of the arrow. Cord 13, after having been wound the required number of turns to form a group of the width desired, terminates at point 16, where the end is bent downwardly and passes underneath the layer terminating at point 17. The cords of the other group are wound in the manner explained.

The cords are impregnated or coated with latex or with a suitable composition which causes them to adhere to each other. The coating, which has been indicated by solid black in Figures 4 and 5, is of sufficient thickness to permit a slight relative movement between the adjacent cords without tearing the agglutinant. The inner surface of the belt is formed from a large number of cords 18 that extend transversely from one side of the belt to the other. These cords, like cords 13, are impregnated or coated with latex or with a suitable rubber-like composition, and after the belt has been formed, it is subjected to a suitable curing treatment, whereby, the parts become interconnected and produce a unitary belt structure. A belt constructed in the manner described is very flexible and has sufficient strength to transmit the power required at a very high speed. The transverse cords 18 serve not only to hold the cords 13 and the two groups together, but they form an excellent friction surface that grips the outer surface of the pulleys to such a degree that a high initial tension is not necessary.

The space between the two groups of tension cords has the effect of keeping the belt centered on convex pulleys and belts constructed in accordance with this invention, in addition to their great flexibility, also last longer than ordinary belts for the reason that they remain centered and the edges therefore do not come into contact with the sides of the pulley or stationary parts of the machine.

Due to the high speed at which these belts operate, very great centrifugal forces are produced when the belt passes around the pulleys and this makes it necessary to anchor the ends of the cords in such a way that they do not tear loose in response to this centrifugal force. The ends are anchored in the manner shown in Figures 3 and 4, which has been found to be very effective for this purpose.

Although a single layer of tension cords is sufficient for very high speed belts, it is permissible to employ two or more layers for slow speed belts; in either case the inner surface is formed by transverse cords.

When rubber composition is mentioned, it is to be understood that either natural or so-called synthetic rubber, can be employed. Instead of rubber, some plastic or other material whose physical properties are such as to adapt it for this purpose may be used, if desired.

From the above description, it will be evident that belts constructed in the manner described and shown on the drawing are exceedingly flexible and have considerable strength due to the use of the spirally wound tension cords. In very high speed belts only a single layer of tension cords is employed and these are formed in two groups so as to increase the tendency of the belt to remain centered on the pulleys. The inner layer of transverse cords serve to hold the two groups of tension cords in position and due to their transverse arrangement they do not add materially to the stiffness of the belt, but provide a very efficient friction surface.

Having described the invention what is claimed as new is:

1. A high speed flat belt, comprising, a single layer of spirally wound tension cords formed from two groups, spaced along the center line of the belt, and a single layer of cords, extending across the two spaced groups, forming the inner surface of the belt, the two spaced groups and the transverse cord layer being adhesively secured to each other by an agglutinant of rubber-like material.

2. A high speed flat belt, comprising, a layer of spirally wound tension cords formed from two groups, spaced along the center line of the belt, and a layer of cords, extending across the two spaced groups, forming the inner surface of the belt, the two spaced groups and the transverse cord layer being adhesively secured to each other by an agglutinant of rubber-like material, the ends of the cords in each spirally wound group being anchored by being positioned underneath the groups in the plane of the transverse cord layer and parallel to the cords forming the layer.

3. A high speed flat belt comprising, a single layer of spirally wound tension cords, formed from two groups, spaced along the center line of the belt, the ends of the two groups being anchored to prevent unraveling, a single layer of cords extending across the belt forming the inner surface of the belt and of the same size to produce an even surface, the groups of spirally wound cords and the transverse cords being adhesively secured to each other by an agglutinant of rubber-like material.

HAROLD J. JOHNSON.